(12) United States Patent
Weick et al.

(10) Patent No.: US 8,247,732 B2
(45) Date of Patent: Aug. 21, 2012

(54) SENSOR ARRANGEMENT FOR A LASER MACHINE TOOL AND AN INSULATOR FOR SUCH A SENSOR ARRANGEMENT

(75) Inventors: Juergen-Michael Weick, Asperg (DE); Tobias Kluehspies, Korntal-Muenchingen (DE); Jens Braun, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1106 days.

(21) Appl. No.: 12/136,912

(22) Filed: Jun. 11, 2008

(65) Prior Publication Data

US 2008/0264914 A1 Oct. 30, 2008

Related U.S. Application Data

(63) Continuation of application No. PCT/EP2005/013560, filed on Dec. 16, 2005.

(51) Int. Cl.
*B23K 26/04* (2006.01)
(52) U.S. Cl. .......... 219/121.62; 219/121.78; 219/121.83
(58) Field of Classification Search .......... 219/121.63–121.72, 121.61, 121.62, 219/121.83
See application file for complete search history.

(56) References Cited

U.S. PATENT DOCUMENTS

| | | | |
|---|---|---|---|
| 2,313,889 A * | 3/1943 | Porter | 73/861.57 |
| 3,233,076 A * | 2/1966 | Vilkas | 219/124.03 |
| 4,618,758 A * | 10/1986 | Gilli et al. | 219/121.67 |
| 5,031,984 A * | 7/1991 | Eide et al. | 385/27 |
| 5,293,023 A * | 3/1994 | Haruta et al. | 219/121.6 |
| 5,438,187 A * | 8/1995 | Reddersen et al. | 235/462.22 |
| 5,500,504 A | 3/1996 | Jagiella et al. | |
| 6,509,744 B1 | 1/2003 | Biermann et al. | |
| 7,566,844 B2 * | 7/2009 | Egawa et al. | 219/121.84 |
| 2002/0070198 A1 | 6/2002 | Brusasco et al. | |
| 2004/0084627 A1 * | 5/2004 | Danilychev | 250/372 |

FOREIGN PATENT DOCUMENTS

| | | |
|---|---|---|
| DE | 4035404 | 5/1992 |
| DE | 19906442 | 9/2000 |
| EP | 0503488 | 9/1992 |
| JP | 9277080 A | 10/1997 |
| JP | 09323182 A * | 12/1997 |
| JP | 2000202676 A | 7/2000 |

OTHER PUBLICATIONS

Office Action from corresponding Chinese Application No. 200580052296.0, dated May 11, 2011, with English translation, 6 pages.
Notification of Transmittal of Translation of the International Preliminary Report on Patentability from corresponding PCT Application No. PCT/EP2005/013560, mailed Jul. 18, 2008, 7 pages.
Office Action for corresponding Chinese Application No. 200580052296.0 dated Dec. 11, 2009, with English translation, 6 pages.
International Search Report and Written Opinion from corresponding PCT Application No. PCT/EP2005/013560, mailed Aug. 29, 2006.

* cited by examiner

*Primary Examiner* — Samuel M Heinrich
(74) *Attorney, Agent, or Firm* — Fish & Richardson P.C.

(57) ABSTRACT

An insulator for a sensor arrangement of a laser processing machine comprises an outer insulating part of plastics material for electrical shielding and an inner shielding part of a non-conductive heat-resistant material for shielding against laser irradiation and/or heat.

6 Claims, 3 Drawing Sheets

SENSOR ARRANGEMENT FOR A LASER MACHINE TOOL AND AN INSULATOR FOR SUCH A SENSOR ARRANGEMENT

CROSS REFERENCE TO RELATED APPLICATION

This application is a continuation of, and claims priority under 35 U.S.C. §120 to PCT/EP2005/013560, filed on Dec. 16, 2005, and designating the U.S., which is hereby incorporated by reference in its entirety.

TECHNICAL FIELD

This invention relates to a sensor arrangement used in a laser machine tool, and to an insulator for such a sensor arrangement.

BACKGROUND

Sensor arrangements for laser machine tools are known, for example through DE 199 06 442 A1. Insulators are a component of sensor arrangements and have become known through their use in commercially available laser processing machines.

Known insulators consist of ceramic material, such as $Al_2O_3$ for example, which has a high resistance to heat and to impacts, but can be machined only with difficulty owing to its hardness. In the case of this type of insulator, the capacitive reactance is more important than the insulation with respect to direct current. This is why a large insulating distance has to be selected in the case of an $Al_2O_3$ insulator.

During cutting, the insulator is affected by diffusely back-reflected radiation. It is therefore moreover necessary for the insulator to consist of a material that is not destroyed or damaged by the back-reflection. $Al_2O_3$ has ideal properties for this purpose since it is very resistant to heat and impact. The drawback of these insulators, however, is the fact that $Al_2O_3$ is complicated and expensive to manufacture.

Prior art conforming to the genre is disclosed in DE 40 35 404 A1. This publication relates to a nozzle for a tool for material processing. Inside, the known nozzle comprises a conical nozzle body having a tip region of brass positioned towards the workpiece and having a surface-anodised and accordingly electrically non-conductive remaining region at the side of the tip region remote from the workpiece. For fixing purposes, the nozzle body is subject to the action of a clamping element. This has an inner body of, for example, steel, as well as an outer body of electrically insulating material surrounding the inner body. The inner body of the clamping element is supported at the remaining region of the conical nozzle body at the end remote from the tip region of the conical nozzle body. The remaining region of the conical nozzle body is offset towards the workpiece with respect to the electrically insulating outer body of the clamping element. The remaining region of the conical nozzle body and the outer body of the clamping element are parts of an insulator, by means of which a nozzle electrode of the known nozzle on the workpiece side is electrically insulated against the rest of the material-processing device into which the nozzle is screwed.

SUMMARY

The invention features a sensor arrangement that can be manufactured simply and inexpensively, and also features a corresponding insulator.

The insulator is constructed from two parts, and comprises an inner shielding part which is arranged on the inside of an outer insulating part. The outer insulating part consists of plastics material and provides electrical insulation. The inner shielding part consists of a non-conductive and heat-resistant material, such as, for example, quartz glass, and is intended for shielding against the above-mentioned back-reflection. The shielding part can be in the form of a quartz glass tube or a ceramic sleeve and can be, for example, adhesively secured in or pressed into the insulating part.

The insulating part may be manufactured inexpensively and simply from a plastics material. The shielding part serves for shielding against the laser irradiation. The shielding part is capable of withstanding relatively high laser powers without melting or other damage. The exact fit of the shielding part can be achieved, for example, by lathe-turning the plastics part, instead of a time-consuming grinding of a ceramics part. There is also no need for a ceramics sintering operation.

The shielding part can preferably consist of a quartz glass tube. Quartz has a very high thermal impact resistance and is inexpensive to manufacture. Alternatively, the shielding part may also consist of ceramic, for example, of $Al_2O_3$.

The details of one or more embodiments of the invention are set forth in the accompanying drawings and the description below. Other features and advantages of the invention will be apparent from the description and drawings, and from the claims.

DETAILED DESCRIPTION

Figure 1:
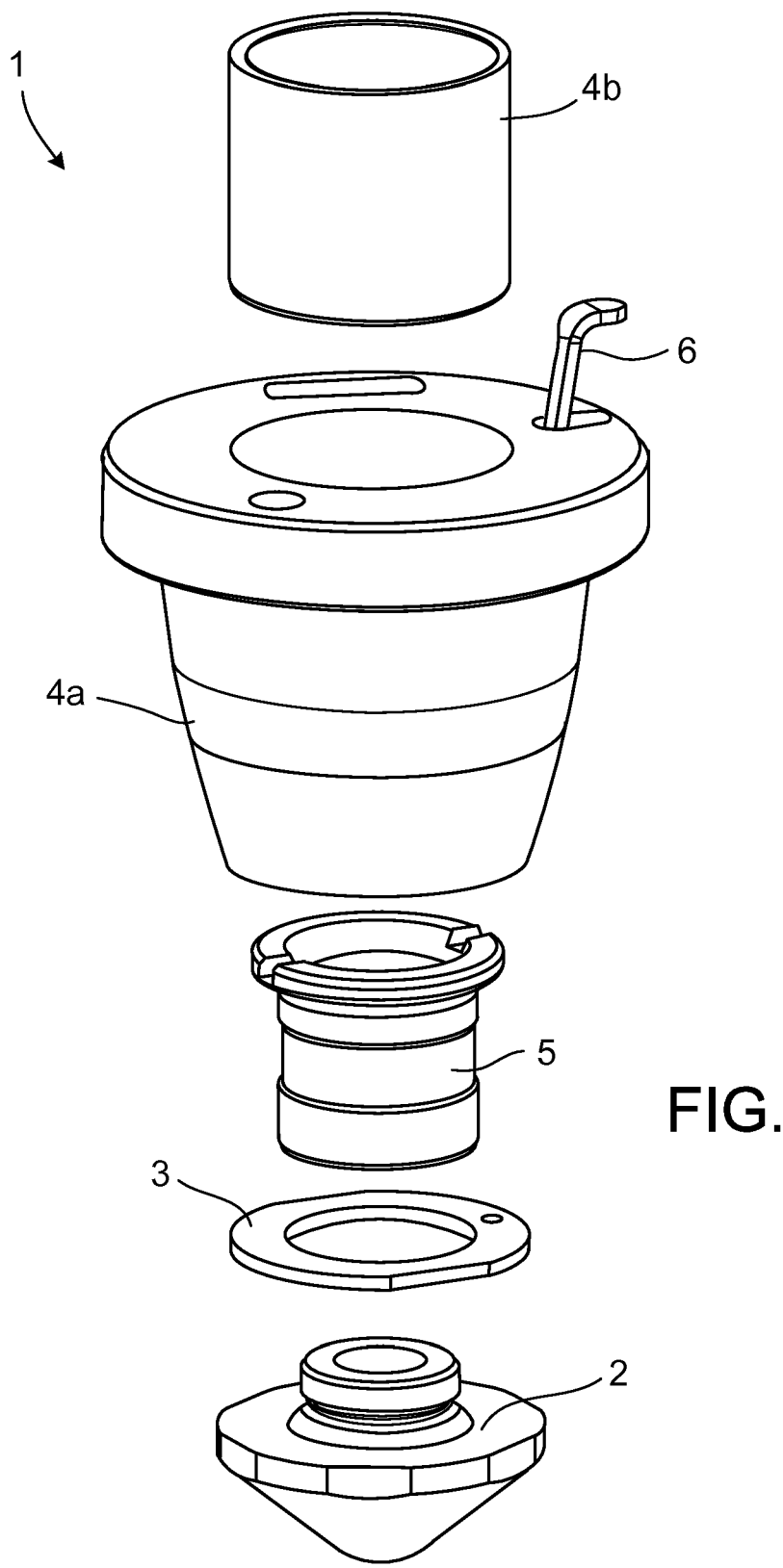
FIG. 1 is an exploded view of a sensor arrangement of a laser processing machine.
Figure 2:
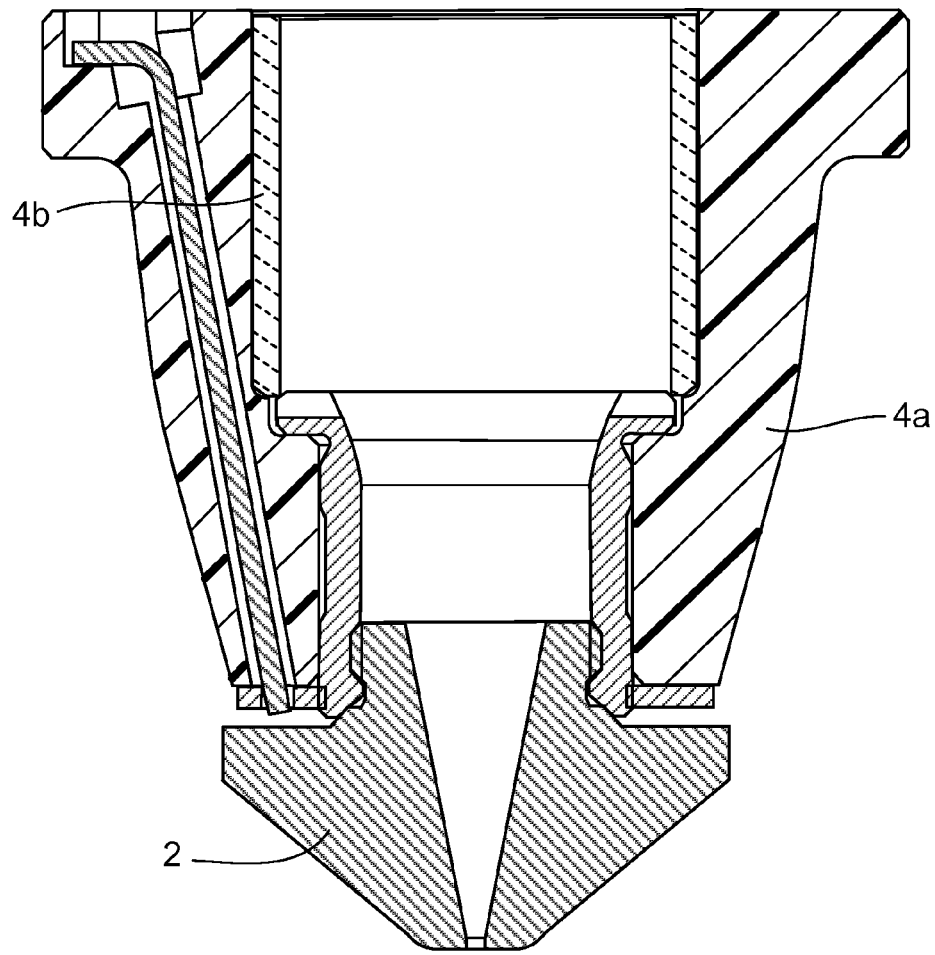
FIG. 2 shows the sensor arrangement in longitudinal section.

FIGS. 1 and 2 show the construction of a sensor arrangement 1 of a laser processing machine, which is suitable for thermal cutting of workpieces by means of a laser beam. The sensor arrangement 1 comprises essentially a laser machining nozzle 2, a contact disc 3, a nozzle holder 5, a two-part insulator (an insulating part 4a for electrical insulation and a shielding part 4b for shielding against irradiation and/or heat) and a contact pin 6. Contact pin 6 establishes contact with a high frequency (HF) oscillator (not shown) that is disposed in the cutting head for sensing the distance between the nozzle and a workpiece (the frequency of the oscillation changes as a function of distance.) The nozzle holder 5 serves to secure the laser machining nozzle 2 to the insulating part 4a.

The two-part insulator is inserted in the sensor arrangement 1 such that the inner shielding part 4b is arranged on the inside of the outer insulating part 4a. The outer part 4a, used for electrical insulation, consists of a suitable plastics material of low capacitive reactance $\epsilon_r$ and high softening point. The scattered radiation protection on the inside of part 4a is provided by a press-fitted (or adhesively secured) quartz glass tube 4b. On the inside of the part 4a, a shield is required as a radiation shield, which protects the part 4a against reflected laser irradiation and against unduly strong thermal radiation destructive to the part 4a.

Figure 3:
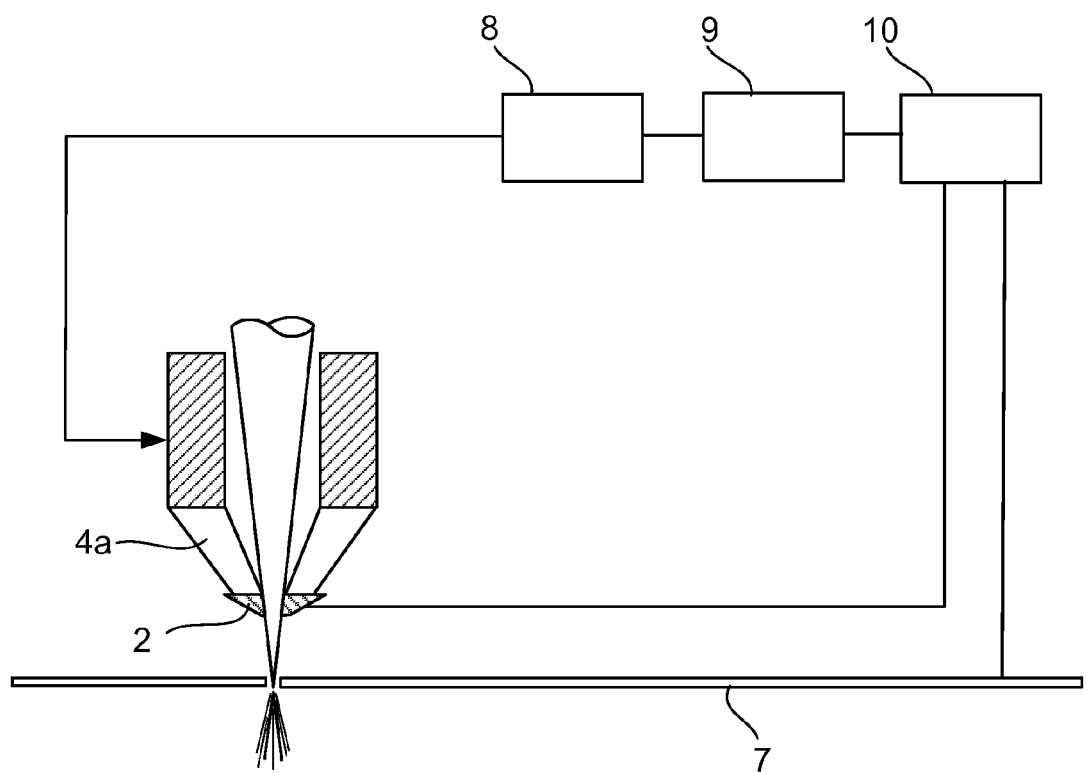
FIG. 3 shows a block diagram for control of the laser processing machine by means of the sensor arrangement.

The measuring principle for controlling the distance of the laser machining nozzle 2 with respect to the workpiece, which is known per se and therefore not described in detail here, is based on the measurement of the electrical capacitance between the laser machining nozzle 2 and a workpiece 7 (FIG. 3). Such a distance control system is known for example, from DE 19906442, the disclosure of which is incorporated herein by reference. The capacitance is distance-dependent and decreases as the distance of the laser machining nozzle 2 from the workpiece 7 increases. Capacitance measurement is effected with the aid of a measuring device 10 on the basis of a resonant circuit, the frequency of which is detuned in dependence on the capacitance. The correlation between the distance and the frequency is produced with the aid of a characteristic curve determined at certain intervals. The distance-dependent signal is detected by the measuring device 10, which includes the oscillator and contact pin arrangement discussed above.

As discussed above, an HF oscillator that is integrated in the laser machining head changes its frequency as a function of the measuring distance. The frequency signal is first of all transferred from the oscillator to an evaluation unit 9 and digitally evaluated. In that process, the distance is determined from the frequency using a characteristic curve picked up in advance. The distance data is then transmitted to a control device 8, which controls the vertical position of the laser machining head relative to the workpiece. The distance of the laser machining nozzle 2 from the workpiece 7 can therefore be kept constant with the aid of the control device 8 of the laser processing machine. The laser machining nozzle 2 is able to trace the contour of the workpiece surface. Collisions between the laser machining head and workpiece 7 are avoided. Furthermore, the position of the workpiece 7 can be determined with the distance control system, so that there is no need for additional displacement to achieve exact alignment.

A number of embodiments of the invention have been described. Nevertheless, it will be understood that various modifications may be made without departing from the spirit and scope of the invention. Accordingly, other embodiments are within the scope of the following claims.

What is claimed is:

1. A sensor arrangement of a laser processing machine, the sensor arrangement comprising:
    a laser machining nozzle,
    an insulator on which the laser machining nozzle is mounted, and which comprises
        an inner shielding part of a non-conductive, heat-resistant material, and
        an outer insulating part of a plastic material configured to provide electrical shielding, wherein the inner shielding part has a tubular construction and a cylindrical shape, wherein the outer insulating part is shielded by the inner shielding part against laser irradiation, heat, or both, and wherein the inner shielding part is arranged within the inner side of the outer insulating part with an exact fit.

2. A sensor arrangement according to claim 1, wherein the inner shielding part consists of quartz glass.

3. A sensor arrangement according to claim 1, wherein the inner shielding part consists of a ceramic material.

4. A sensor arrangement according to claim 1, wherein the inner shielding part is secured in place by an adhesive.

5. A sensor arrangement according to claim 1, wherein the inner shielding part is press-fitted into place.

6. A sensor arrangement according to claim 1, further comprising a contact pin.

\* \* \* \* \*